United States Patent Office 2,844,862
Patented July 29, 1958

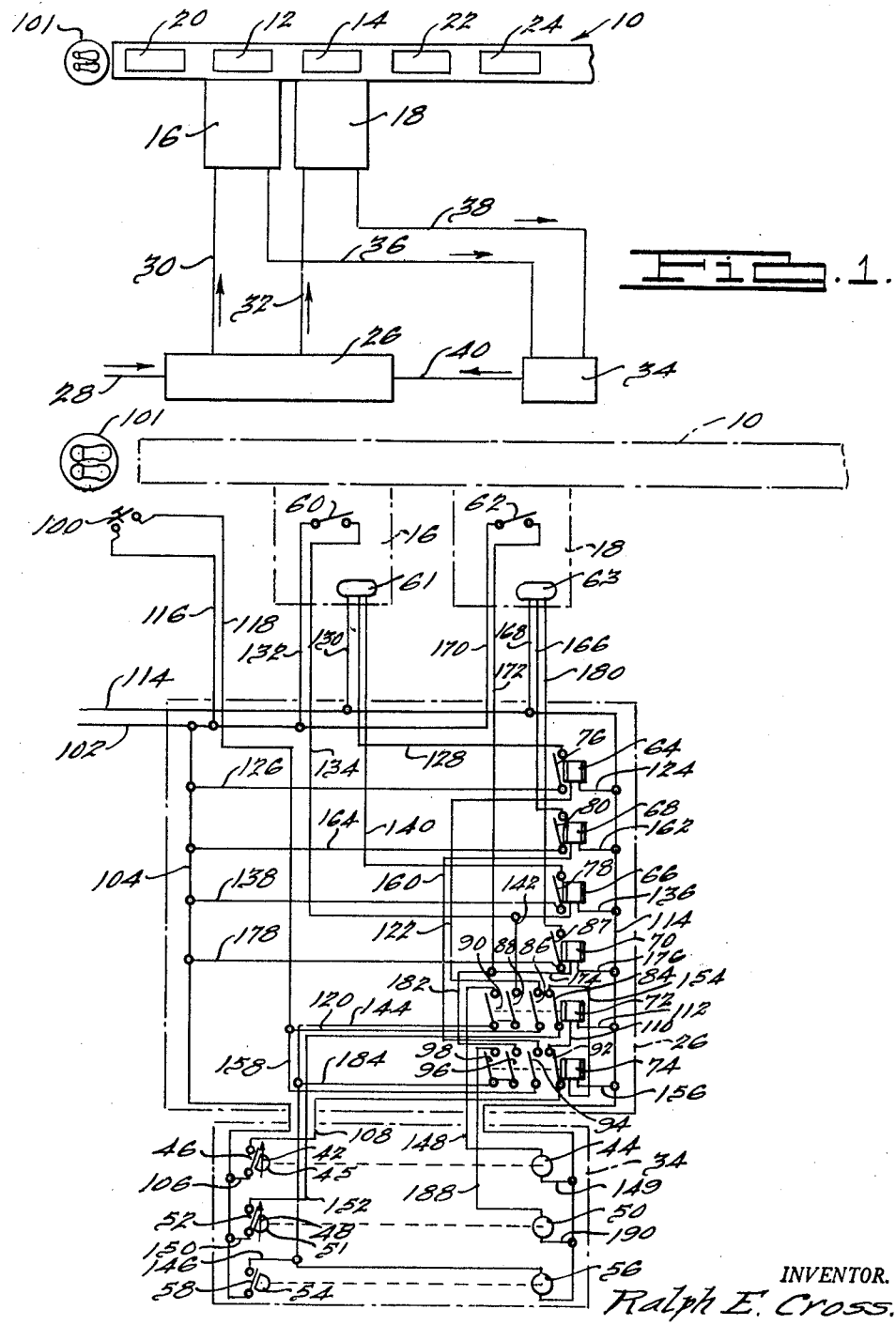

2,844,862

MACHINE TOOL AND METHOD OF PROGRAMING THE OPERATION THEREOF

Ralph E. Cross, Grosse Pointe Shores, Mich., assignor to The Cross Company, Detroit, Mich., a corporation of Michigan Application July 8, 1953, Serial No. 366,713

8 Claims. (Cl. 29—1)

This invention relates broadly to machine-tool automation and more particularly to a novel operating procedure or method and means for operating and controlling machines in a machine-tool production line so as to obviate the necessity of shutting down the line or any part thereof when the machines require servicing and which permits all of the machines in the line to operate at the highest efficiency of the tools.

It has long been recognized that automation is highly desirable in the field of discrete unit production. In actual practice, however, this has proved to be exceedingly difficult primarily because of the difficulty of securing the necessary flexibility of operation required to maintain automatic production. All machines require servicing from time to time and they must of course be shut down while being serviced. When a machine in a production line is shut down, flow of the workpieces or units being produced usually ceases, resulting in loss of production time and increased unit cost.

For example, many machines have an exceedingly large number of cutting tools, and the life of the different tools in a single machine may vary considerably. It is of course necessary to change tools periodically as they become dull or broken, and the machine must be shut down each time the tools are changed. In ordinary operation, the production line in which the machine is situated is stopped while the tools are being changed. One of the most difficult problems in securing automatic operation of a machine-tool production line is the problem of making tool changes, when necessary, without interrupting or stopping the function of the machine and the operation which it performs on the work and without stopping or in any way impairing the other operations performed by other machines in the line.

In the conventional operation of every machine tool having a relatively large number of cutters, an engineer initially lays out a program for changing the tools. This program is based on the estimated life of the tools, and in laying out this program the engineer attempts to set times for shutting down the machine for tool changing and to arrange these down times to achieve maximum convenience at minimum cost or expense. However, the program frequently is interrupted by unexpected contingencies. In the past it has been necessary for the engineer, whenever the program is disrupted for some reason, to devise a new program. This is a lengthy and difficult job where a large number of tools are involved, and as a practical matter this method of operating a machine tool has never been entirely satisfactory.

In connection with the foregoing it should be understood that the instant invention is concerned basically with any service requirement of a machine. Manifestly all service requirements can not be listed separately and the specific examples of tools becoming dull or broken is intended merely as representative of service requirements to which machines of the type here under consideration are subject. This of course is an important and ever-recurring service requirement of machines which perform cutting operations on a workpiece, and it is a problem of pressing importance at the present time. However, it is not intended that the instant invention be limited to tool wear as a specific service requirement of machines. It is specifically intended that the invention be broader than that and that it operate as a consequence of any service requirement.

Heretofore it has sometimes been the practice to maintain several identical or similar machines in a plant and to route the workpieces to the several machines in accordance with the service requirements of the machines. For example, parts normally routed to one machine for processing are routed to a second machine when the first machine is shut down for servicing or for other reasons. The workpieces are sent to the second machine continuously until the first machine is again in service and are then routed to it in the usual way. The machine referred to above as the second machine may remain idle when the so-called first machine is in operation, but usually it is kept in production as much as possible.

The above technique for maintaining constant operation of a production line and requisite fluidity of movement of parts along the line has been generally unsatisfactory because it requires constant attention and supervision by a machine operator and because of difficulty in scheduling production so that the stand-by machine is ready to take over a function of a machine in the production line when the latter machine requires servicing. If the machine operator fails to notice that a machine requires servicing or to restrict delivery immediately to the stand-by machine, the production line is disrupted. In a situation of this kind the human factor is exceedingly important and cannot be overlooked in any program for maintaining automatic operation of a process line.

The present invention obviates difficulties heretofore encountered by providing a pair of identical or similar machines preferably side by side in the production line and of operating these machines alternately so that one machine is always in operation to perform its intended function in the line. The word "machines" as used above does not necessarily mean completely separate machines but may mean merely independently operable parts or mechanisms of a single machine such as separately operable, dual spindles in a turret or equivalent setup, for example. Also, it should be pointed out that the word "machine" or "machine tool" as used herein means any apparatus or device for performing a cutting or forming operation on a workpiece. In a situation of the type referred to above, both machines operate individually at different times, and in accordance with the present invention they are operated by a single machine-control unit under the guidance of a single memory-control or programing device. As suggested, tool changing has been selected as a particular and typical service requirement of machines, and in order to make the disclosure specific and exact the following portion of the specification is directed to this type service operation. However, it is to be understood that the invention is not necessarily limited to this particular service requirement.

In the particular example here selected, the programing means in the control system for the machines automatically keeps track of and accounts for all of the cutting tools in the machines. When any tool or group of tools in the operating machine becomes dull, the unit automatically stops that machine and starts the other machine in production. The worn tools can then be replaced without halting production anywhere along the line and without affecting other tools in the machine. Alternatively, if a tool breaks in the operating machine, the operator or suitable automatic controls stop the machine, and the other machine is automatically placed in operation while the broken tool is replaced. As soon as the worn or broken tool or tools have been replaced, the operator resets the part of the memory unit associated therewith and the tooling program is automatically re-established without necessity of changing or in any way affecting other parts of the memory unit associated with other tools in the machine. When tools in the second machine become worn so as to require changing, the control unit of this invention shuts down the second machine and automatically starts the first machine again in production. The operator then proceeds as hereinabove described to put the stand-by machine in condition for operation and again sets the memory unit so that production will proceed automatically when any tool or group of tools in the operating machine is broken or becomes so dull as to require changing. It is a feature of this invention that the memory and control units can be readily adapted to any machine regardless of the number of cutting tools which it employs or the nature of the operations which it performs, and when so adapted the memory unit automatically keeps track of all the tools and controls operation of the machines in such a way that production is never stopped or interrupted for any appreciable or significant period of time.

In the drawing forming a part of this specification and wherein like numerals are employed to designate like parts throughout the same, Fig. 1 is a simplified diagrammatic view showing part of a machine tool production line and illustrating a pair of automatic machine tools operated and controlled according to the instant invention, and Fig. 2 is a more elaborate diagrammatic view showing a typical control circuit for operating the machines according to the present invention and illustrating one specific type of memory unit that can be adapted to the control system of this invention.

Reference is first had to Fig. 1 wherein the numeral 10 designates generally a machine-tool production line having a pair of work stations 12 and 14 provided with machine tools 16 and 18 respectively. Other stations 20, 22, and 24 also are provided along the line 10, and these stations may be either idle stations or work stations, according to the exigencies of the particular situation. It is contemplated of course that other machines be provided as required along the production line in order to perform necessary operations on a workpiece to be moved along the line. Also, it is contemplated that the production line 10 be equipped with a transfer mechanism for moving the workpieces step by step progressively from one station to another and that suitable mechanisms be provided in each work station for locating and clamping the workpieces securely and accurately with respect to the cutting tools of the machines in the station. However, inasmuch as the invention is not concerned with any of the machines in the line except the two machines 16 and 18 here shown or with any of the mechanisms for transferring parts along the line or with mechanisms for locating and clamping the parts with respect to the machine tools, these mechanisms are not specifically illustrated. Any of a number of known mechanisms can be adapted for these operations and it is contemplated, at least in so far as the instant invention is concerned, that suitable conventional means be employed to achieve the various functions referred to specifically above.

As suggested, the two machines 16 and 18 are similar in construction and operation, and it is contemplated that these machines be operated alternately. Thus, when machine 16 is in operation, machine 18 is shut down; and when machine 18 is in operation, machine 16 is shut down. If automatic transfer mechanisms are employed, it will of course be necessary to correlate the transfer device with the machines 16 and 18 so that a part is delivered to the machine which is in operation. However, it will be readily appreciated that although automatic transferring of the part is preferred in order to secure maximum efficiency, it makes no difference in so far as this specific invention is concerned whether the part is transferred automatically or manually.

Specifically, power is delivered to a machine-control unit 26 as indicated at 28 and this power is transmitted from the machine-control unit to one or the other of machines 16 and 18 as indicated at 30 and 32. From the machines 16 and 18, current flows to a program-control or memory unit 34 as indicated at 36 and 38 and thence back to the machine-control unit 26 as indicated at 40. It is intended to illustrate primarily by the diagram of Fig. 1 that the machine-control unit 26 has provision for directing power either to the machine 16 or to the machine 18 and that the program-control unit 34 is connected in the operating circuit in such a way that it determines which of the two machines 16 and 18 shall be supplied with power from the unit 26. Also, as suggested above, the program control unit 34 is provided with means which automatically keeps account of tool wear on various tools or groups of tools in the machines 16 and 18 and preferably apprises the operator at all times of the used and unused life of each type of tool operating in the machine. Any of a large number of common storage media or memory devices such as punched cards, punched tape, magnetic tape or wire, film, magnetic drums or disks and dielectric storage devices, all conventional and well known to the art, can be used in or adapted for the memory unit 34; but the "Toolometer" control unit illustrated and described in the copending application Serial No. 162,176 filed in the Patent Office May 16, 1950, and issued May 18, 1954, as Patent No. 2,679,038 is preferred, as it not only keeps track of the tools in the machines but also provides a visual record of the used and unused life of each tool or type of tool. The use of a Toolometer unit as the program control device of this invention makes it easier for the operator to be fully aware at all times of the exact condition of all the tools in the machines under his supervision and is of particular advantage in situations where the number of tools to be accounted for is exceedingly large.

In accordance with the foregoing I have shown in Fig. 2 a Toolometer-type program control unit 34 and have correlated this unit with operative means in the machine-control unit 26 for operating the two machines 16 and 18 automatically and alternatively. The program-control unit 34 here shown has one visual indicator pointer 42 mechanically driven by a motor 44 and provided with a cam 45 which operates a normally open switch 46 electrically connected in the system to control the operation of machine 16. The program-control unit 34 also is provided with a second visual indicator pointer 48 mechanically driven by a motor 50 and provided with a cam 51 which operates a normally open switch 52 electrically connected in the system to control the other machine 18. In the interest of simplicity only two visual indicators 42 and 48 are shown, one for each of the machines 16 and 18. However, it will be readily apparent to those skilled in the art that any required number of indicators can be provided for each of the machines 16 and 18 and that in any particular instance the number of indicators used will depend upon the number of different tools or groups of tools used in the machines. Also, the manner in which multiple indicators of the type here shown are connected in an electrical control system is brought out in greater detail in the prior application hereinabove specifically referred to. It is contemplated that a separate indicator be provided for each tool or group of tools in the machines so that each indicator keeps track of the number of operations performed by the tool or group of tools with which it is associated and informs the operator at all times of the used and unused life of such tools. When the pointers 42 and 48 are positioned as shown in the drawing, the cams 45 and 51 are disposed so that the switches 46 and 52 are open. However, when the pointers 42 and 48 are rotated from the positions shown, the cams 45 and 51 close their respective switches 46 and 52. Each of the motors 44 and 50 is energized for a predetermined interval of time each time its respective machine operates. This period of energization may be of any desired duration but one to two seconds usually is sufficient. In the drawing the timer comprises a cam 54 driven mechanically by a motor 56 to operate a switch 58, and the switch 58 is electrically connected in the system to control the energization of motors 44 and 50.

In practice, the operator knows or can ascertain with reasonable certainty the life of the cutting tools in the machines 16 and 18. He will know by exercise of ordinary mechanical skill and judgment that a certain tool can be operated a certain number of times before it needs sharpening and that after it is operated for the estimated number of times it should be taken out and sharpened in order to maintain maximum operating efficiency of the machine. If the machine has a number of different types of cutting tools, the operator can tell in each instance approximately how many cutting operations the tools can perform before they should be removed from the machine and sharpened. Inasmuch as the particular apparatus shown in the drawing has only one set of tools for each machine 16 and 18 and the program-control unit 34 has only two dials, one for the tools in each machine, it is merely necessary for the operator in this instance to ascertain the estimated life of the tools and then adjust the pointers 42 and 48 to a position which is a function of the estimated tool life. In actual practice suitable dials usually are provided behind each of the pointers 42 and 48, and these dials are numbered in accordance with the number of estimated operations that the tools can perform. For example, if the tools in machines 16 and 18 can operate five hundred times before sharpening is necessary, the dials associated with the pointers 42 and 48 are calibrated to register at least five hundred operations; and when the tools are first placed in the machines, the operator merely sets the pointers to register five hundred operations on their respective dials. When the pointers are thus positioned, switches 46 and 52 of course are closed. Thereafter when one of the machines 16 and 18 is operated it energizes the master timer motor 56 once for each operation of the machine and the master timer energizes the motor 44 or 50 associated with the operative machine to rotate the pointer connected to such motor one increment of dial space. Under the specific circumstances set forth above, the actuating motor 44 or 50 will have to be energized five hundred times in order to return the pointer 42 or 48 to its initial starting position. However, after the machine has operated the requisite number of times and the pointer has returned to its initial or starting position, the cam associated therewith opens the switch controlled thereby and shuts down the machine. At the same time, the other machine is automatically placed in operation and, in the supposititious situation set forth, it will operate for five hundred times before shutting down. In the meantime, the operator changes the tools in the inoperative machine, resets the indicator pointer associated therewith, and the machine then stands by ready for operation until the other machine completes its period of operation. It will be readily apparent that the pointers 42 and 48 tell the operator at a glance exactly how much of the estimated life of the tools remains.

It is assumed for purpose of illustration that the machines 16 and 18 are equipped with the usual cutting head which advances to bring the tools into operative association with the work, and after the tools have performed the cutting operation the heads are retracted to withdraw the tools from the work. Machines of this type are common and conventional and it is thought therefore that a detailed description of the same need not be given. In order to illustrate the principle of this invention, however, a limit switch 60 and a conventional machine operating circuit designated generally at 61 for advancing and retracting the cutter head are shown on the machine 16 while a limit switch 62 and a similar machine operating circuit illustrated generally at 63 are shown on the machine 18. It is contemplated that each of the switches 60 and 62 be closed once for each operating cycle of its respective machine, and in the particular control system shown the switches are adapted to be closed each time the cutter heads of the machines have reached the forward position of the cutting stroke.

The machine control unit 26 has a relay 64 which operates to advance the cutter head of machine 16 and a control relay 66 which operates to retract the cutter head of machine 16. The machine-control unit 26 also has a control relay 68 which operates to advance the cutter head of machine 18 and a control relay 70 which operates to retract the cutter head of machine 18. The machine-control unit 26 also has control relays 72 and 74 which operate automatically in conjunction with the switches 46 and 52 to operate the machines 16 and 18 automatically in alternate relation. To this end it will be observed that the control relays 64, 66, 68, and 70 have single, individual, normally open switches 76, 78, 80, and 87 respectively, the control relay 72 has a normally closed switch 84 and normally open switches 86, 88, and 90, and control relay 74 has a normally closed switch 92 and normally open switches 94, 96, and 98. Operation of the machines is initiated by a cycle-start switch 100. The numeral 101 designates the position of the machine operator.

When operating the control system of this invention the operator first sets the indicator pointers 42 and 48. If he sets the pointer 42 first, machine 16 will operate before machine 18 when the cycle-start switch 100 is closed. On the other hand, if he sets the indicator pointer 48 first, the machine 18 will operate before machine 16 when the cycle-start switch 100 is closed. For the purpose of describing the operation of the control system, it will be assumed that the operator has set the indicator pointer 42 and that the pointer 48 has not yet been set. Under these circumstances the cam 45 has closed switch 46, and switch 52 is still open. Immediately when switch 46 closes, current from any suitable source to which the system is connected flows through lines 102, 104, and 106 to the closed switch 46 and thence through line 108 to the normally closed switch 92 of control relay 74. From the switch 92, current flows through line 110 to the control relay 72 and thence through lines 112 and 114 back to the source. When this occurs, relay 72 of course is energized to open switch 84 and close switches 86, 88, and 90. Switch 84 is in electric series with control relay 74; and when it is open, the indicator pointer 48 which controls machine 18 can be set to close switch 52 without effect.

When both indicator pointers 42 and 48 have been set to close their respective switches 46 and 52 in the manner described, machine 16 is set for operation and machine 18 will stand by ready to begin operation immediately and automatically when machine 16 completes its period of operation. The only thing required then to start machine 16 in operation is closure of the cycle-start switch 100. When this switch is closed, current flows from the source through lines 102 and 116, through the closed switch 100, and thence through lines 118 and 120 to the now-closed switch 86. From this switch, current passes through line 122 to the control relay 64 and thence through lines 124 and 114 back to the source. This action energizes relay 64 and closes switch 76. Immediately upon closure of switch 76, current flows from the source through lines 102 and 126, to the closed switch 76, and thence through line 128 to the machine operating circuit 61, then through the common return line 130 and thence back to the source through line 114. This action renders the circuit 61 operative in an obvious manner to advance the cutting head of machine 16. As suggested, when the cutter head reaches the forward limit of its travel it closes limit switch 60 and this action permits current to flow from the source through lines 102 and 132, through the closed switch 60 and thence through line 134 to the control relay 66. From relay 66 current flows through lines 136 and 114 back to the source. Energization of relay 66 closes switch 78 and current can then flow from the source through lines 102, 104, and 138, closed switch 78 and thence through line 140 to the circuit 61. From the circuit 61, current travels through lines 130 and 114 back to the source. Flow of current through the circuit 61 in this manner reverses its operation and causes the cutter head of machine 16 to retract.

Closure of the limit switch 60 also produces another effect, as currnet can flow from line 134 through line 142, through the now-closed switch 88 and along line 144 to the motor 56 of the master timer. Thence current flows along line 114 back to the source. Immediately when motor 56 is energized it begins to rotate the cam 54 and initial rotation of the cam closes switch 58. This permits current to flow from the source along lines 102 and 104 through the switch 58 and along lines 146 and 144 through the motor 56 and thence back to the source along line 114. Thus the motor 56 continues to run even after the machine has backed away from and again opened the limit switch 60. Further, the motor 56 will continue to run as long as the cam 54 holds switch 58 closed. In practice, the switch 58 will remain closed until the flat side of the cam moves again into register with the switch as shown in the drawing. When this occurs, the switch 58 opens and interrupts flow of current to the motor 56 which is then de-energized. As suggested, the motor 56 can be energized for any desired period of time but it preferably is energized for only a second or two.

In the supposititious situation described above, energizing current is supplied to the Toolometer motor 44 only when switch 58 is closed. Specifically, current flows from the source along lines 102 and 104 through the closed switch 58 along lines 146 and 144 through the closed switch 90 and thence through line 148 to the motor 44 and thence through line 149 to line 114 which carries it back to the source. Current cannot flow to the other Toolometer motor 50 even though switch 52 is closed, because of the open switch 98 in direct series connection with the motor. Further, it is obvious that flow of current to the Toolometer motor 44 ceases immediately when switch 58 opens. Thus the Toolometer motor 44 remains energized only so long as the switch 58 is closed and, as suggested, this switch will remain closed only for a very short time.

From the foregoing it will be apparent that the indicator pointer 42 is indexed each time the machine 16 with which it is associated operates and that the pointer is moved progressively from its initial position by successive operations of the machine. By properly correlating the indicator pointer 42, the master timing mechanism and the life of the tools in the machine 16, it is possible for the operator to know at any particular time during the operation of the machine exactly what portion of the estimated life of the tools has been used and what portion remains. With this knowledge the operator is informed at any particular time, merely by glancing at the indicator pointers of the Toolometer devices, exactly how many hours or minutes of operating time remain for the machine before tool changing is necessary. Also, if the machine has a large number of tools or groups of tools all having different estimated life spans, each indicator keeps track of its own tool or group of tools independently of the others and thus maintains an automatic program for the machine. Further, this program is not disturbed or in any way affected by shutdown of the machine or by changing one tool or group of tools or even by breakage of one tool in a group. The program initially established for the machine remains the same, and the program is automatically maintained regardless of the number of tools accounted for by the program-control unit 34.

When the machine 16 completes a number of operations corresponding to the estimated life span of the tool or tools associated with the indicator pointer 42, the latter moves to a position where cam 45 permits switch 46 to open. Immediately when this occurs, flow of current to the control relay 72 is interrupted and the relay 72 is de-energized to close switch 84 and to open switches 86, 88, and 90. As soon as switch 84 closes, current can flow from the source along lines 102, 104, and 150 through the preset switch 52 and thence along line 152 through the closed switch 84, along line 154 through the control relay 74 and thence along lines 156 and 114 back to the source. Manifestly, this energizes control relay 74, opening switch 92 and closing switches 94, 96, and 98. This action establishes circuits which render the stand-by machine 18 operative immediately when the cycle-start switch 100 is closed and renders machine 16 inoperative so long as machine 18 is operative. During the time machine 16 is shut down, the operator changes the worn tools, makes a routine inspection of the machine, and, when all is in order, again sets the Toolometer indicator 42. The latter action, however, is without effect because of the open switch 92 in electrical series with the Toolometer switch 46. Switch 92 remains open as long as the machine 18 under the control of Toolometer switch 52 remains operative; but when the machine 18 completes its operating period, switch 52 opens and machine 16 is again rendered operative, giving the operator opportunity to change the tools in machine 18 and to reset the Toolometer indicator 48 so that the machine 18 will again operate automatically after the machine 16 completes its period of operation. In this manner the two machines 16 and 18 operate alternately automatically and a complete tool program is maintained for both machines.

The electrical operating and control circuits for the machine 18 are similar to the circuits hereinabove described in detail in connection with machine 16, and they therefore will be described only briefly. Closure of the cycle-start switch 100 completes a circuit through the switch, the current flowing through line 158, switch 94 and lines 160 and 162 to energize the control relay 68 to close switch 80. When relay switch 80 closes, a circuit is established, including line 164, switch 80, line 166, machine operating circuit 63, and line 168. Flow of current through the circuit 63 in this manner causes the cutting head of machine 18 to advance and to move the cutting tools carried by the head against the work.

When the cutter head of machine 18 reaches the forward limit of its travel it closes the limit switch 62. This completes a circuit including line 170, switch 62, lines 172 and 174, control relay 70, and line 176 to energize the control relay and close switch 87. Closure of switch 87 completes a circuit, including lines 178 and 180 and circuit 63. Flow of current through the machine operating circuit 61 in this manner retracts the cutter head of the machine 18.

Closure of limit switch 62 also completes a circuit, including lines 182, switch 96, and line 184 through the master timer motor 56. The latter then operates in the manner hereinabove described to close switch 58 for a predetermined relatively short interval of time; and when switch 58 is closed, an operative circuit including line 184, switch 98, lines 188 and 190, is established through the Toolometer motor 50. The motor 50 is energized as long as switch 58 is closed to index the indicator pointer 48 in the manner hereinabove described in connection with the other Toolometer indicator 42.

It may thus be seen that I have achieved the objects of my invention. I have provided a novel method of programing machines in a machine-tool production line so that all of the tools in the machines are automatically accounted for at all times. The programing system can be readily adapted to any machine and is not affected even though the number of tools in the machine is exceedingly large. The program can be established and maintained under all conceivable operating conditions, and even though the estimated or actual life of different tools in the machine are of radically different duration. The novel means herein provided for maintaining the program thus established keeps the operator constantly informed of the exact condition of all tools in the machine, lets him know exactly the condition of every tool in the machine, and keeps him informed as to the exact amount of production time remaining for any tool or group of tools. Accomplishment of these objects increasing the operating efficiency of the production line maintains a constant flow of units being produced past the machines and obviates the necessity of shutting down the line and stopping flow of the parts because tools in a machine require changing.

Having thus described the invention, I claim:

1. A pair of machines having cutting tools requiring periodic sharpening and having operating circuits, programing means operably connected to said machines to indicate when said cutting tools require sharpening and machine-control means connected to the operating circuits of both machines and to said programing means controlled by said programing means and operative to actuate said machines alternately in accordance with the tool requirements of the machines.

2. A pair of machines having tool means requiring periodic changing and having operating circuits, a programing means operably connected to said machines and having separate indicators responsive to operation of said machines to indicate when said tool means require changing, and machine-control means connected to the operating circuits of said machines and to said programing means controlled by the indicators in said programing means and operative to actuate said machines alternately in accordance with the change requirements of said tool means.

3. A pair of machines having cutting tool means requiring periodic sharpening and having operating circuits, a programing means having a pair of indicators each associated with a respective one of said machines and each actuated in progressive increments of motion by successive operations of the machine with which it is associated to indicate the number of cutting operations performed by said tool means and therefore the relative sharpness of said tool means, and machine-control means connected to the operating circuits of said machines and to said programing means controlled by the indicators of said programing means to operate said machines alternately automatically as a function of the sharpness characteristics of said tool means, whereby the tool means of each machine can be removed and sharpened during the period said machine is idle without disrupting the flow of work to said machines or stopping the operations performed on said work by said machines.

4. A pair of machines having cutting tool means requiring periodic sharpening and having operating circuits, switch means controlling said operating circuits, programing means operative to actuate said switch means in accordance with the requirements of said tool means for sharpening, and machine-control means including said switch means connected to the operating circuits of said machines and to said programing means responsive to actuation of said switch means to operate said machines alternately in accordance with the sharpening requirements of said tool means.

5. A pair of machines having cutting tool means requiring periodic sharpening and having operating circuits, a separate switch means controlling the operating circuit of each machine, programing means having a pair of indicators each operatively connected to a respective one of said switch means, said indicators being initially manually positionable to operate said switch means so as to render one of said machines operative and to maintain the other of said machines inoperative, each of said indicators being actuated in successive increments of motion by its respective machine as a measure of the relative sharpness of the tool means of said machine and being operative after successive operations to actuate said switch means to render the previously operating machine inoperative and simultaneously to render the previously inoperative machine operative.

6. A program-control device adapted for use with a pair of machines having cutting tools requiring periodic sharpening and having respective operating circuits each controlled by respective switch elements, comprising a pair of indicators each adapted to be actuated repeatedly and in uninterrupted sequence in successive increments of motion by a respective one of said machines as a measure of the relative sharpness of the tools of said machine and each connected to and operative to actuate a respective one of said switch elements, and machine-control means adapted for connection to the operating circuits of said machines and controlled by said switch elements to operate said machines alternately in accordance with the requirements of said tools for sharpening as indicated by said indicators.

7. In combination with a pair of machines having cutting tools therein, an electrical operating circuit for each machine, an electrically operated mechanism in each of said operating circuits including an indexable switch element manually initially positionable to designate the estimated life span of the tool in the machine with which it is associated, electrical actuators for said switch elements, and a timer mechanism rendered operative by operation of said machines for energizing said actuators for a predetermined period of time so as to index said switch elements once for each operation of the machine, and means controlled by said switch elements for operating said machines in alternate cycles wherein each machine is normally operated repeatedly and in uninterrupted sequence during its operating cycle for a length of time measured by the initial position of the indexable switch element associated with said machine.

8. In combination with a pair of machines having cutting tools therein, an electrical operating and control circuit for each of said machines, each circuit having a normally open switch adapted to be closed once for each operation of the machine associated with said circuit, an electrically operated mechanism including indexable switch elements in said circuits each manually initially positionable to designate the estimated life span of tools in the machine in circuit therewith, and electrical actuators for said switch elements, a timer mechanism operable by closing of said normally open switches for energizing said electrical actuators for a predetermined period of time so as to index said indexable switch elements once for each operation of the machine, and means in said operating and control circuits controlled by said indexable switch elements for operating said electrical actuators and said machines in alternate cycles wherein each machine is normally operated repeatedly and in uninterrupted sequence during its operating cycle for a length of time measured by the initial position of the indexable switch element associated with said machine.

(References on following page)

References Cited in the file of this patent

UNITED STATES PATENTS

| | | |
|---|---|---|
| 1,286,687 | McGary | Dec. 3, 1918 |
| 1,317,238 | Summey | Sept. 30, 1919 |
| 2,029,335 | Oberhoffken et al. | Feb. 4, 1936 |
| 2,576,201 | Wilson | Nov. 27, 1951 |
| 2,655,646 | Callahan et al. | Oct. 13, 1953 |
| 2,679,038 | Cross et al. | May 18, 1954 |

FOREIGN PATENTS

| | | |
|---|---|---|
| 649,983 | France | Dec. 31, 1928 |